US010123281B2

(12) United States Patent
Boudreau et al.

(10) Patent No.: US 10,123,281 B2
(45) Date of Patent: *Nov. 6, 2018

(54) INTER-NETWORK ASSISTED POWER CONTROL FOR INTERFERENCE MITIGATION OF D2D COMMUNICATIONS

(71) Applicant: Telefonaktiebolaget LM Ericsson (publ), Stockholm (SE)

(72) Inventors: Gary Boudreau, Kanata (CA); Christian Bergljung, Lund (SE); Muhammad Kazmi, Bromma (SE); Iana Siomina, Täby (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/590,471

(22) Filed: May 9, 2017

(65) Prior Publication Data
US 2017/0245221 A1 Aug. 24, 2017

Related U.S. Application Data

(63) Continuation of application No. 14/424,112, filed as application No. PCT/SE2015/050027 on Jan. 14, 2015, now Pat. No. 9,661,585.
(Continued)

(51) Int. Cl.
H04B 7/00 (2006.01)
H04W 52/24 (2009.01)
(Continued)

(52) U.S. Cl.
CPC ......... H04W 52/242 (2013.01); H04W 24/10 (2013.01); H04W 52/245 (2013.01);
(Continued)

(58) Field of Classification Search
USPC .............................. 455/522, 69–70
See application file for complete search history.

(56) References Cited

U.S. PATENT DOCUMENTS

2009/0325625 A1    12/2009  Hugi
2013/0281143 A1*   10/2013  Nentwig ........... H04W 72/1231
                                                              455/501
(Continued)

FOREIGN PATENT DOCUMENTS

WO    2007/064249    6/2007
WO    2012/034268    9/2010
(Continued)

OTHER PUBLICATIONS

"Notification of Transmittal of the International Search Report and the Written Opinion of the International Searching Authority, or the Declaration" International application No. PCT/SE2015/050027; 16 pages, dated Jun. 3, 2015.
(Continued)

Primary Examiner — Fayyaz Alam
(74) Attorney, Agent, or Firm — Baker Botts, LLP

(57) ABSTRACT

According to some embodiments, a first network node manages a transmit power of a first wireless device capable of device-to-device, D2D, communication. The first network node receives at least one measurement report from at least one of the first wireless device and a second wireless device in D2D communication with the first wireless device. The measurement report indicates a received signal measurement or path loss with respect to the other of the first wireless device and the second wireless device and/or a received signal measurement or path loss with respect to a victim node. The first network node sends the first wireless device instructions to make an adjustment of the transmit power that the first wireless device uses in the D2D com-
(Continued)

munication. The adjustment is at least partially based on the received measurement report.

22 Claims, 10 Drawing Sheets

Related U.S. Application Data

(60) Provisional application No. 61/937,964, filed on Feb. 10, 2014.

(51) Int. Cl.
    *H04W 76/14*     (2018.01)
    *H04W 76/10*     (2018.01)
    *H04W 52/38*     (2009.01)
    *H04W 52/28*     (2009.01)
    *H04W 24/10*     (2009.01)

(52) U.S. Cl.
    CPC ....... *H04W 52/283* (2013.01); *H04W 52/383* (2013.01); *H04W 76/10* (2018.02); *H04W 76/14* (2018.02)

(56) References Cited

U.S. PATENT DOCUMENTS

| | | | |
|---|---|---|---|
| 2013/0310103 A1* | 11/2013 | Madan | H04W 52/242 |
| | | | 455/522 |
| 2014/0004867 A1* | 1/2014 | Noh | H04W 76/023 |
| | | | 455/450 |
| 2015/0078270 A1* | 3/2015 | Seo | H04W 52/46 |
| | | | 370/329 |
| 2015/0139111 A1* | 5/2015 | Fodor | H04W 52/12 |
| | | | 370/329 |

FOREIGN PATENT DOCUMENTS

| | | |
|---|---|---|
| WO | 2013/100831 | 12/2011 |
| WO | 2013/137580 | 3/2013 |
| WO | 2015/114052 | 8/2015 |
| WO | 2015/114104 | 8/2015 |

OTHER PUBLICATIONS

3GPP Work Item Description; 3GPP TSG RAN Meeting #58; Source: Qualcomm Incorporated; Title: Study on LTE Device-to-Device Proximity Services (RP-122009)—2008.

Communication pursuant to Rule 164(1) EPC, Application No. 15746417.3-1875, 21 pages, dated Aug. 8, 2017.

* cited by examiner

INTER-NETWORK ASSISTED POWER CONTROL FOR INTERFERENCE MITIGATION OF D2D COMMUNICATIONS

PRIORITY

This application is a continuation, under 35 U.S.C. § 120, of U.S. patent application Ser. No. 14/424,112, which is a U.S. National Stage Filing under 35 U.S.C. § 371 of International Patent Application Serial No. PCT/SE2015/050027, filed Jan. 14, 2015, and entitled "INTER-NETWORK ASSISTED POWER CONTROL FOR INTERFERENCE MITIGATION OF D2D COMMUNICATIONS" which claims priority to U.S. Provisional Patent Application No. 61/937,964 filed Feb. 10, 2014, both of which are hereby incorporated by reference in their entirety.

TECHNICAL FIELD

Certain embodiments relate, in general, to wireless communications and, more particularly, to inter-network assisted power control for interference mitigation of D2D communications.

BACKGROUND

Wireless networks allow wireless devices to send and/or receive wireless signals containing voice traffic, data traffic, control signals, and/or any other suitable information. FIG. 1 illustrates an example of a wireless network 100 that includes wireless devices 110a-110e (e.g., user equipment, UEs) and a plurality of radio access nodes 120a-120b (e.g., eNodeBs or base stations) connected to one or more core network nodes 130 via an interconnecting network 125. Wireless devices 110 may each be capable of communicating directly with radio access nodes 120 over a wireless interface. Wireless devices may also be capable of communicating with each other via device-to-device (D2D) communication.

Wireless device 110 may be capable of moving in and out of various coverage scenarios. At a given time, a wireless device 110 may be in one of three coverage scenarios: an In-Network Coverage scenario (INC), a Partial Network Coverage scenario (PNC), or an Out-of-Network Coverage scenario (ONC). The INC scenario is illustrated by wireless devices 110a and 110c. Wireless devices 110a and 110c are in D2D communication. Each of wireless device 110a and wireless device 110c is also within coverage of at least one radio access node 120 of the wireless network. Because each wireless device 110 is within coverage of a radio access node 120 during the INC scenario, the network can ensure that the D2D communication does not cause unnecessary interference.

The PNC scenario is illustrated by wireless device 110b. As illustrated, wireless device 110b is not capable of communicating directly with the wireless network infrastructure because it is outside the coverage area of radio access nodes 120. Wireless device 110b may be outside the coverage area due to lack of any radio access node 120 in its vicinity or due to insufficient resources in any of the radio access nodes 120 in its vicinity. In the PNC scenario, wireless device 110b is capable of communicating with wireless device 110a via D2D communication, and wireless device 110a is within coverage of a radio access node 120. Because wireless device 110a is within the coverage of a radio access node 120, wireless device 110b can communicate with the wireless network infrastructure indirectly via its D2D connection with wireless device 110a.

The ONC scenario is illustrated by wireless devices 110d and 110e. Wireless devices 110d and 110e may each be outside the coverage area due to lack of any radio access node 120 in the vicinity or due to insufficient resources in any of the radio access nodes 120 in the vicinity. Thus, in the ONC scenario, wireless devices 110d and 110e are not communicating with the wireless network either directly or indirectly. However, wireless devices 110d and 110e may communicate with each other via D2D communication.

D2D communication can be exploited in cellular networks to improve overall network capacity as well as mitigate coverage holes for wireless devices 110 that do not have network coverage. In certain D2D communication scenarios, D2D communication may be bi-directional communication where both wireless devices 110 receive and transmit in the same or different resources. In other D2D communication scenarios, one of the wireless devices 110 transmits and the other one receives the signals. There may also exist a point-to-multipoint (e.g., multicast, broadcast) scenario in which case a plurality of wireless devices 110 receive signals from the same transmitting wireless device 110. This scenario may be particularly useful for emergency services or public safety operation to spread vital information to several wireless devices 110 in an affected area. The term D2D communication and D2D operation may be used interchangeably herein.

During D2D communication, wireless devices 110 generate radio emissions. The emissions outside of wireless device 110's frequency band are often termed as out of band (OOB) emissions or unwanted emissions. The major OOB and spurious emission requirements are typically specified by the standard bodies and eventually enforced by the regulators in different countries and regions for both wireless devices 110 and radio access nodes 120. Examples of the OOB emissions are Adjacent Channel Leakage Ratio (ACLR) and Spectrum Emission Mask (SEM). Typically these requirements ensure that the emission levels outside the transmitter channel bandwidth or operating band remain several tens of dB below transmitted signal.

To conserve wireless device 110's battery power, the power amplifier (PA) of wireless device 110 may be designed to operate efficiently. Thus, the PA may be designed for certain typical operating points or configurations or set of parameter settings, such as modulation type, number of active physical channels (e.g., resource blocks in Evolved Universal Terrestrial Radio Access (E-UTRA) or number of Code Division Multiple Access (CDMA) channelization codes code/spreading factor in UTRA). To ensure that wireless device 110 fulfills OOB/spurious requirements for all allowed uplink transmission configurations, wireless device 110 is allowed to reduce its maximum uplink transmission power in some scenarios. This is called maximum power reduction (MPR) or UE power back-off in some literature. For instance a wireless device 110 with maximum transmit power of 24 dBm power class may reduce its maximum power from 24 dBm to 23 or 22 dBm depending upon the configuration.

In E-UTRA, an Additional-MPR (A-MPR) for the wireless device 110 transmitter has also been specified in addition to the normal MPR. The A-MPR can vary between different cells, operating frequency bands, and more specifically between cells deployed in different location areas or regions. In particular, the A-MPR may be applied by wireless devices 110 in order to meet the additional emission requirements imposed by the regional regulatory organization. A-MPR is an optional feature, which may be used by the network when needed depending upon the co-existence scenario. The A-MPR defines the wireless device 110's maximum output power reduction (on top of the normal MPR) needed to fulfill certain emission requirements by accounting for factors such as: bandwidth, frequency band, or resource block allocation. The network node may control the A-MPR by signaling to wireless device 110 a parameter called network signaling (NS) parameter. For example NS_01 and NS_02 correspond to different levels of pre-defined A-MPRs.

In certain D2D scenarios, the D2D communication may be network assisted. In network assisted D2D communication, wireless devices 110 in the vicinity of each other can establish a direct radio link (D2D bearer). While wireless devices 110 communicate over the D2D "direct" bearer, they also maintain a cellular connection with their respective serving radio access node 120. This direct link is interchangeably called as network (NW) link, D2D-NW link, etc. The NW link may be used for any suitable purpose, such as resource assignment for D2D communication, maintenance of radio link quality of D2D communication link, etc. Unfortunately, known methods for network assisted D2D communication are unable to fully manage the interference. Therefore D2D communications could potentially cause interference to both serving cellular networks as well as in legacy co-located networks or co-existing networks in the same geographical region.

In LTE, potential D2D interference can be intra-frequency co-channel interference (i.e., collisions between transmitted resource blocks (RBs) within the system bandwidth) as well as interference from in-band emissions from the transmitting RBs within the system bandwidth into adjacent RBs to those RBs being employed for the desired transmission. In addition D2D communications can result in inter-device and intra-device interference across a number of channels in LTE including, such as the Physical Uplink Control Channel (PUCCH) and the Physical Uplink Shared Channel (PUSCH). The D2D communication may typically take place over LTE uplink channels such as PUCCH/PUSCH or similar channels.

As an example of inter-device interference, two wireless devices 110, X and Y, communicate via D2D communication in given subframes 2, 3 and 4 on the uplink (UL) (e.g., on UL spectrum in FDD). In these subframes, wireless device Y receives information from wireless device X in a first set of resource blocks. Also during these subframes a third wireless device Z transmits to a radio access node 120 in uplink resources in a second set of resource blocks within the same system bandwidth that wireless device Y is receiving D2D communication from wireless device X. In this example, the second set of resources is a PUCCH transmission in subframe 2 and a PUSCH transmission in subframe 3. Due to in-band emissions, wireless device Z will create a "high interference" area where wireless device Y is possibly unable to decode data from wireless device X. This "high interference" area may be a function of device Z transmit output power, the path loss to wireless device Y, wireless device C's resource block allocation, the receive power level of wireless device Y and the D2D resource block allocation, and/or wireless device C inband emission levels at the frequency of the D2D resource block allocation.

Such inter-device interference scenarios can occur in both partial (PNC) and full (INC) coverage scenarios. It is also possible that inter-device interference could occur in "no-coverage" (ONC) scenarios if, for example, wireless devices X and Y are both out of coverage, and device Z is within coverage but close to the edge of coverage and close to wireless devices X and Y, such that it can still create an exclusion zone for these devices.

D2D transmissions can be broadly classified into discovery or communications transmissions. Since PUCCH transmissions are generally pre-assigned with a fixed periodicity, the PUCCH transmissions could potentially impact both the discovery and the communications phases of D2D. However with regard to PUSCH transmissions, the PUSCH transmissions of wireless device Z could be scheduled to avoid the discovery phase of the D2D transmissions, but likely not the D2D transmissions during the communications phase. The interference zone due to the inband emissions for these inter-device scenarios can be quite large, potentially on the order of tens or hundreds of meters.

As an example of intra-device interference, such interference may occur when wireless device X is transmitting simultaneously both to a nearby wireless device Y using D2D communication in a first set of resource blocks, and transmitting to a network (NW) node using a second set of resource blocks. An example scenario for this would be when a device X transmits a beacon signal (or pilot signal) and simultaneously transmits a PUCCH to the network node, but other scenarios may also exist. Note that the intra-device interference may be limited to full (INC) and partial (PNC) coverage scenarios.

SUMMARY

Certain embodiments relate to functionality of a first network node. The first network node comprises processing means, such as a processor and a memory containing instructions executable by the processor, for performing the described functionality. The first network node manages a transmit power of a first wireless device capable of device-to-device, D2D, communication. The first network node receives at least one measurement report from at least one of the first wireless device and a second wireless device in D2D communication with the first wireless device. The measurement report indicates a received signal measurement or path loss with respect to the other of the first wireless device and the second wireless device and/or a received signal measurement or path loss with respect to a victim node. The victim node refers to a network node or a third wireless device for which a transmission from the first wireless device and/or the second wireless device creates interference that affects the victim node. As an example, the first wireless device may send a D2D transmission to the second wireless device. Although a neighbouring node is not the intended recipient of the D2D transmission, the D2D transmission may interfere with the neighbouring node's ability to receive other transmissions for which it is the intended recipient. Thus, in the example, the neighbouring node is a victim node.

In response to receiving the at least one measurement report, the first network node sends the first wireless device instructions to make an adjustment of the transmit power that the first wireless device uses in the D2D communication. The adjustment is at least partially based on the received measurement report. In certain embodiments, the first network node may also send information related to the adjustment of the first wireless device's transmit power to the victim node or another network node.

In certain embodiments, the adjustment of the transmit power that the first wireless device uses in the D2D communication can be partially based on one or more other factors. For example, the adjustment may be partially based on a reference signal of the victim node. The first network node may receive the reference signal of the victim node via the first wireless device or the second wireless device. For example, the first wireless device or the second wireless device receives the reference signal from the victim node and forwards the reference signal to the first network node. As another example, the adjustment may be partially based on the position of the first wireless device relative to the position of the victim node. As another example, the adjustment may be based on information obtained from the victim node and indicating propagation conditions seen by the victim node.

In addition to instructing the first wireless device to make an adjustment of the transmit power, the first network node may optionally instruct the first wireless device to make an adjustment of one or more other radio parameters that the first wireless device uses in the D2D communication, such as current transmit power level, maximum output power, spectral emission mask, maximum power reduction, additional maximum power reduction, and/or power adjustment step. The term transmit power is a generic term which may correspond to current transmit power, average transmit power, maximum transmit power, etc. The current transmit power is typically the power with which the wireless device transmits signals during certain time period or time resource, for example, power transmitted during the current time slot, current subframe, current symbol, group of subframes, group of symbols, etc. The maximum output power is also interchangeably called as nominal output power.

In some embodiments the first network node is the serving network node of the first wireless device, the second wireless device, or both. The first network node may operate on a first carrier frequency, f1, and the victim node may operate on a second carrier frequency, f2. The first carrier frequency, f1, and the second carrier frequency, f2, are different and may be adjacent or non-adjacent in frequency domain. Certain embodiments relate to a method that may be performed in the first network node to a transmit power of the first wireless device. The method comprises receiving at least one measurement report from at least one of the first wireless device and a second wireless device in D2D communication with the first wireless device. The measurement report indicates a received signal measurement or path loss with respect to the other of the first wireless device and the second wireless device and/or a received signal measurement or path loss with respect to a victim network node. The method further comprises sending the first wireless device instructions to make an adjustment of the transmit power that the first wireless device uses in the D2D communication, wherein the adjustment is at least partially based on the received measurement report.

Certain embodiments relate to functionality of the first wireless device. The first wireless device comprises processing means, such as a processor and a memory containing instructions executable by the processor, for performing the described functionality. For example, the first wireless device sends the at least one measurement report to the first network node. The measurement report indicates a received signal measurement or path loss with respect to a second wireless device in D2D communication with the first wireless device and/or a received signal measurement or path loss with respect to a victim network node. The first wireless device receives from the first network node a transmit power that the first wireless device is to use in the D2D communication. The wireless device adjusts the transmit power that it uses in the D2D communication based on the received transmit power.

The measurement report sent by the first wireless device may include a signal measurement that the first wireless communication measures on a signal transmitted by the second wireless device or a signal measurement that the first wireless communication receives from the second wireless device in response to the second wireless device measuring a signal transmitted by the first wireless device.

In some embodiments, the first wireless device receives a reference signal of the victim node. The first wireless device adjusts the transmit power based on the strength of the received reference signal and/or forwards the reference signal to the first network node.

In some embodiments, the first wireless device sends the first network node an indication of a time period during which the D2D communication is going to take place. Thus, the first network node can determine to adjust the transmit power (e.g., if the D2D communication is going to take place for an amount of time that exceeds a threshold) or to not adjust the transmit power (e.g., if the D2D communication is going to take place for an amount of time less than the threshold).

Certain embodiments relate to a method that may be performed in the first wireless device. For example, the method comprises sending at least one measurement report to the first network node. The measurement report indicates a received signal measurement or path loss with respect to a second wireless device in D2D communication with the first wireless device and/or a received signal measurement or path loss with respect to a victim network node. The method further comprises receiving from the first network node a transmit power that the first wireless device is to use in the D2D communication and adjusting the transmit power that the first wireless device uses in the D2D communication based on the received transmit power.

Some embodiments of the disclosure may provide one or more technical advantages. A technical advantage of some embodiments may include managing the transmissions of D2D UEs to avoid unnecessary interference that can degrade the performance of other UEs and/or network nodes. In some embodiments, D2D transmissions may be efficiently managed regardless of whether the D2D communication takes place in an INC, PNC, or ONC coverage scenarios. Some embodiments may benefit from some, none, or all of these advantages. Other technical advantages may be readily ascertained by one of ordinary skill in the art.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

In device-to-device (D2D) communication, D2D capable wireless devices 110 may transmit at or close to full power in order to maximize their potential coverage area, particularly in the first stages of the establishment of a D2D connection. Network assisted D2D communication is an example of D2D operation that involves management by a network node (e.g., radio access node 120). Even D2D wireless devices 110 under network control may tend to operate with full power in existing networks. In typical scenarios, a D2D wireless device 110 may be in the vicinity of various other wireless devices 110 and radio access nodes 120, which may belong to the same operator and/or other operators. The radio emissions from the D2D wireless device 110 may interfere with other nodes (victim nodes), especially when the D2D wireless device 110 operates at full power. The impact on the victim node (e.g., neighbouring radio access node 120) can be even more severe when the D2D wireless device 110 is close to the victim node. Particular embodiments of the present disclosure may provide systems and methods to avoid or minimize such a degradation at the victim node due to D2D communication.

D2D communications have the potential to cause interference to both serving cellular networks as well as legacy networks (especially legacy networks that are co-located with the serving cellular networks). The interference may also affect networks in the same geographical areas where D2D wireless devices 110 operate. The nodes affected by the interference may be referred to as victim nodes. Victim nodes can include radio access nodes 120 (i.e., victim network nodes) and/or wireless devices 110 (i.e., victim devices). Victim nodes may be interchangeably referred to as victim receivers because the interference impacts the node's ability to receive wireless transmissions intended for the victim node.

Figure 1:
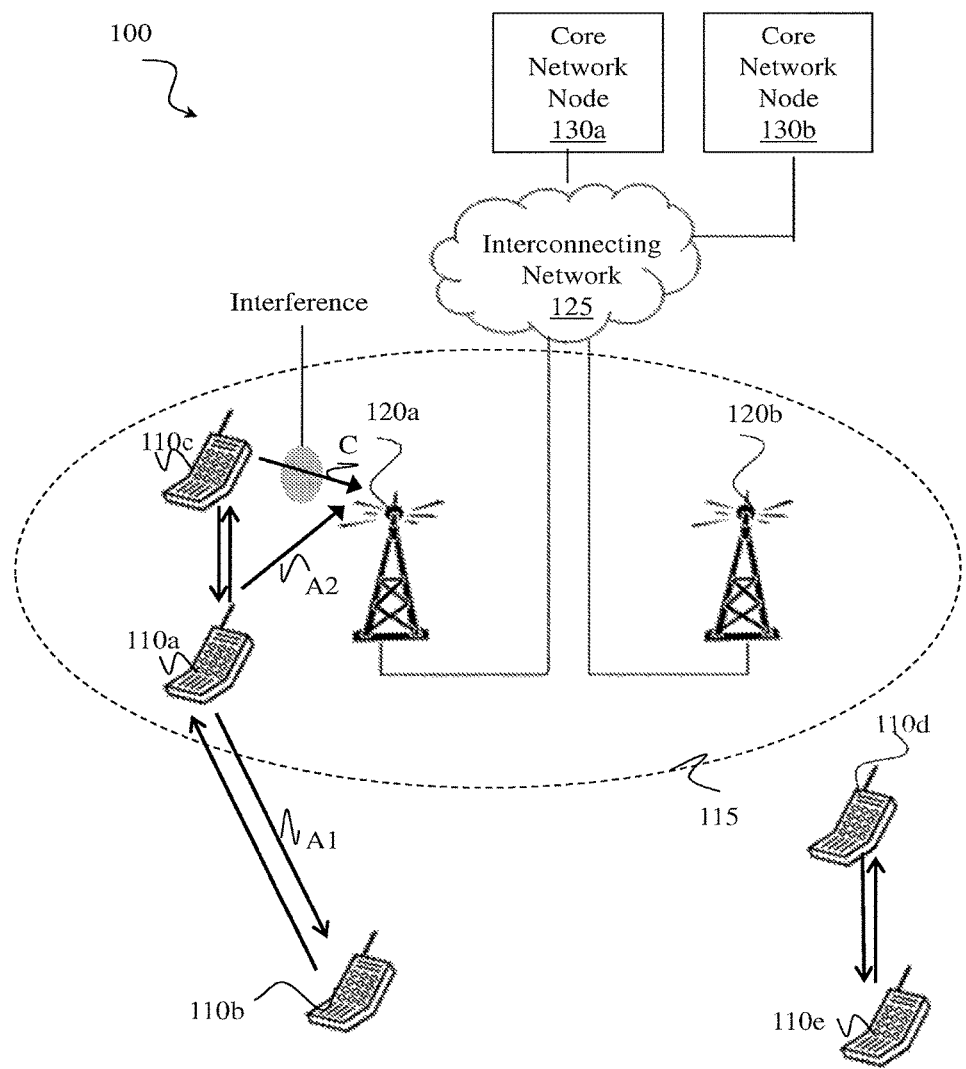
FIG. 1 is a block diagram illustrating an example of a wireless network.

For example, the scenario illustrated in FIG. 1 shows the case in which a D2D transmission (A1) between wireless devices 110a and 110b acts as an aggressor or interferer to an uplink cellular transmission (C) between wireless device 110c and radio access node 120a (the victim node). Note that for downlink transmissions such an interference scenario can only occur when the cellular network is operating in time division duplex mode and the D2D transmission is not synchronized to the cellular network. For a frequency division duplex cellular network, since the D2D transmissions are on the uplink, no co-channel interference will occur on the frequency division duplex downlink channel, however, interference to co-located co-existing networks can occur.

The interfering situation may tend to become worse when D2D wireless devices 110 are in partial network coverage (PNC scenario) or even worse when they are completely out of network coverage (ONC scenario). This may lead to severe performance degradation, inability to sustain D2D communication, and inability to meet regulatory requirements on radio emissions by the D2D wireless devices 110.

Particular embodiments of the present disclosure may provide methods for mitigating such interference in D2D communication.

In general, wireless device 110 operation related to D2D communication involves transmission and/or reception of radio signals, which are associated with one or more radio parameters. Examples of radio parameters are receiver sensitivity, transmission power, transport format, MRP, A-MPR, and so on. The D2D wireless device 110 may operate in any one of the INC, PNC, or ONC coverage scenarios. In known systems, the D2D wireless device 110 uses the same value for the radio parameters regardless of the type of coverage in which it operates. Unlike the legacy approach, particular embodiments of the present disclosure use at least one radio parameter specific to the coverage type in which the D2D wireless device 110 operates. The remaining parameters may not necessarily depend upon the coverage and are therefore not coverage specific. Therefore coverage related parameters used by the D2D wireless device 110 may refer to parameters that depend upon the type of coverage in which the D2D wireless device 110 is operating or performing D2D communication.

The list of coverage related parameters may be pre-defined, configured by the network node at the D2D wireless device 110, and/or broadcasted by the network node. For example, different values of the same parameter may be pre-defined to be used by the D2D wireless device 110 for different coverage scenarios, such as INC, PNC, and ONC scenarios. The coverage related radio parameters can be related to radio transmission and/or radio reception.

Examples of coverage related radio parameters that can be specific to radio transmission (e.g., RF transmitter parameters) include: UE transmit power, UE maximum output power, UE minimum output power, UE OFF power (UE power after transmitter is OFF), UE MPR, A-MPR, ON/OFF time mask of uplink signals (e.g., physical random access channel (PRACH), sounding reference signal (SRS), PUCCH, PUSCH, etc.), transmit power tolerance or accuracy (e.g., absolute or relative power tolerance such as +/1 dB), transmit signal quality (e.g., error vector magnitude (EVM), NS value controlling A-MPR, frequency error, carrier leakage (i.e., leakage of signal within bandwidth), in-band emissions, out of band emission, spectrum emission mask, additional spectrum emission mask, Adjacent Channel Leakage Ratio (ACLR), spurious emissions, additional spurious emissions, transmit intermodulation, time alignment error between signals from different carriers and/or different transmit antennas, transmission bandwidth, transport format (e.g., modulation and coding scheme (MCS), number of transport block, size of transport block etc.), step size of power control, etc.

Examples of coverage related radio parameters that can be specific to radio reception (e.g., RF receiver parameters) include: reference sensitivity power level (aka REFSENS), maximum input level, adjacent Channel Selectivity (ACS), blocking characteristics (e.g., in-band blocking, out-of-band blocking, narrow band blocking, spurious response, receiver intermodulation (e.g., wide band intermodulation), spurious emissions, receiver image, reception bandwidth, etc.

Other parameters that may be exchanged between networks include positioning information of the victim nodes relative to the positions of the aggressor network nodes as well as channel fingerprinting or propagation information of the victim network relative to the aggressor network.

The coverage related parameters may also be specific to or linked to frequency bands and/or channel bandwidth. For example different parameter values may be defined for different bands and/or channel bandwidth.

Figure 2:
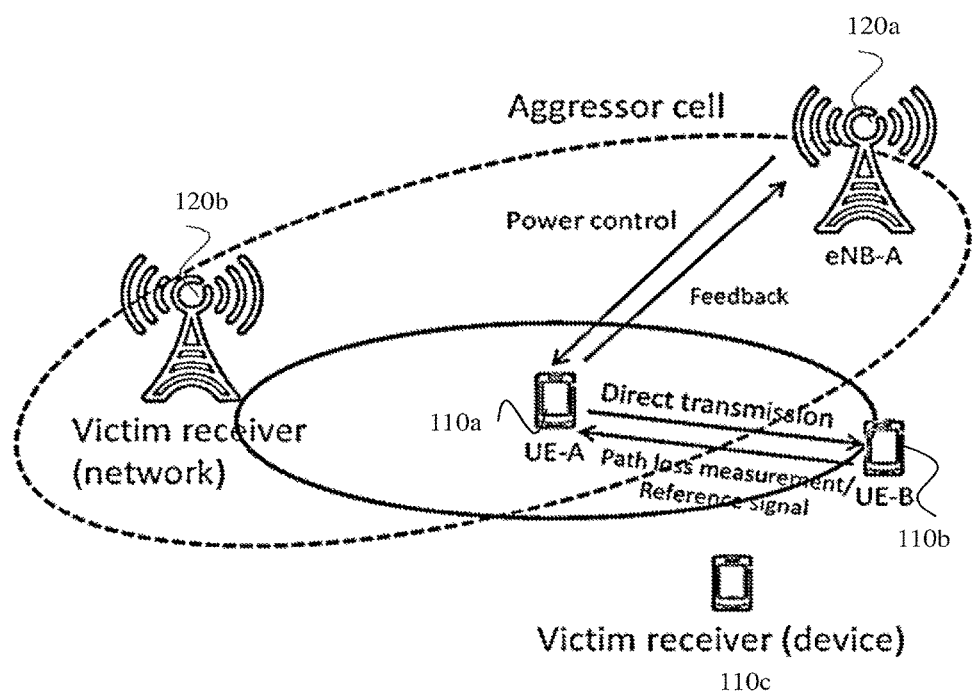
FIG. 2 is a block diagram illustrating an example of network assisted D2D power control.

FIG. 2 illustrates the basic concept of particular embodiments of the present disclosure in which an eNB of the serving network assists power control of D2D transmissions in the serving network. In FIG. 2, UE "A" supports a D2D service (e.g., D2D broadcast communication, D2D group communication, D2D unicast communication, or D2D discovery) with UE "B." At least one of UE-A and UE-B is connected to the serving network of eNB "A."

In a first example, only UE-A may transmit a signal and UE-B may receive the signal transmitted by UE-A. In this case, UE-B cannot send any information to UE-A. But, UE-B can send information to the network node (eNB-A) if it has a communication link with the network node.

In second example, both UE-A and UE-B may transmit signals and also receive signals from each other in the same or different time slots or subframes. In this case, UE-B may also be able to send information to UE-A. The UE-B may also be able to send information (e.g., measurement results) to the network node (eNB-A) if it has a communication link with the network node.

In the first example above, the UE-A can implicitly obtain information related to a radio quality at the receiver of UE-B. The implicit determination may be done by the UE-A by determining the propagation conditions experienced by or expected to be experienced by the UE-B. Examples of propagation conditions are determining the delay spread, Doppler spread, etc. of radio signals transmitted by the UE-B. The UE-B however can explicitly determine its received signal quality on signals received from the UE-A. Therefore, both UE-A and UE-B can send implicit and explicit information about determined quality at the UE-B to the network node provided they have a communication link with the network node.

In the second example above, the UE-A can implicitly and/or explicitly determine the received signal quality of signals received from UE-A at the UE-B. The UE-B can also do the same determination of signal quality at the UE-A since both transmit and receive signals for D2D communication. For example the explicit determination can be done by UE-A based on measurement done on signals transmitted by UE-B; examples of such measurements are path loss, signal measurements (e.g., reference signal received power (RSRP), reference signal received quality (RSRQ), bit error rate (BER), signal to interference-plus-noise ratio (SINR), signal-to-noise ratio (SNR), block error rate (BLER), etc.). The implicit determination can be done by the UE-A based on measurement reports received from UE-B, for example, path loss or signal measurements done on signals transmitted by UE-A. The implicit determination by UE-A can also be done by determining the propagation conditions of UE-B as explained in the first example. The UE-B can perform similar determination for signal quality of UE-A. Then UE-A and/or UE-B can send the determined signal qualities to the network node depending upon which one has the communication link with the network node.

The signal quality related information can be obtained by measurements by UE-A and/or UE-B as explained above, or possibly through the use of a feedback channel from UE-B to UE-A. Examples of feedback signal is acknowledgement/non-acknowledgement (ACK/NACK) sent in response to received data, power control commands, etc. The interested D2D receivers such as UE-B may transmit a known signal (e.g., reference signal) to enable such measurements at UE-A. An example of a known signal in the context of LTE is the SRS or another signal (e.g., demodulation reference signal (DMRS), beacon signal, etc.) indicating that the UE is an interested receiver, but not a transmitter, can be employed. It can be pre-defined that the D2D UE shall periodically transmit certain type of signals to assist the other D2D UE to assess its radio conditions. This signal may or may not be different from the beacon for discovery signals employed in D2D communication.

Based on these gathered metrics and measurements, UE-A and/or UE-B may then provide a measurement report that includes information about radio quality experienced by UE-B when receiving at least UE-A signals. The measurement report may be provided to the serving network node (eNB-A in the example). In some embodiments, the UE-A and/or UE-B may determine to signal this information only when one or more conditions are met. For example, if the determined or assessed UE-B signal quality is better than a first threshold or worse than a second threshold, then the UE-A may send the information to the network node. In some embodiments, the network node may also configure the UE-A with one or more thresholds for triggering the report related to UE-B.

The same procedure of reporting the information related to radio quality of the UE-A may also be applied by the UE-B. For example if there is bi-directional communication between UE-A and UE-B (i.e., both UE-A and UE-B transmit) then both UE-A and UE-B may signal the information related to the signal quality assessed for the other UE.

In yet another example the UE receiving the signal (e.g., UE-B) from another UE (e.g., UE-A) may also evaluate or measure its own received quality on signals received from another UE (e.g., UE-A) and may send the report containing the evaluated signal quality (e.g., path loss, signal strength, etc.) directly to its serving network node.

In the above examples, the UE-A and/or UE-B may regularly determine the signal quality and report the results to the network node periodically or when one or more conditions are met. The periodicity may be configured by the network node (e.g., eNB-A) or it may be pre-defined.

In some embodiments, the network node takes into account one or more of the following information/data to adjust radio transmission parameters of UE-A and/or UE-B:

(1) Measurement report received from UE-A about signal quality of UE-B;

(2) Measurement report received from UE-B about signal quality on signals received from UE-A;

(3) Measurement reports received from additional D2D transmitting and/or receiving UEs (e.g., their current transmit power levels, their transmission activity level, such as periodicity of transmitting signals, etc.);

(4) An explicit or implicit indication of a time period during which the D2D service is going to take place or the number of transmit occasions that will be used for the D2D service. For example, an explicit indication may be a time interval (the total from the start or the remaining time with respect to the time of sending the indication. An implicit indication may be a validity period of the radio resources allocated for the D2D service (e.g., a validity time period for which the set of subframes allocated for transmissions from a D2D broadcast D2D UE-transmitter), where the validity period may also be pre-defined. The number of D2D transmit occasions may depend on, for example, the total time period and the transmission periodicity. In one example embodiment, if the time period is relatively short (e.g., below a threshold), the network node may decide to not adjust the transmit power;

(5) Historical information about previous reports received from UE-A and/or UE-B or other D2D UEs; and/or (6) UE capability whether it is capable of adjusting or modifying its radio emission mask or not. This can be obtained by receiving a UE capability message.

All or some of the information above may be pre-defined or received from another node or UE.

The network node (e.g., eNB-A) based on the above information may instruct the UE transmitting radio signals for D2D communication (e.g., UE-A and/or UE-B) to adjust one or more of its parameters specific to radio transmissions. The parameters may be selected with the goal of ensuring that the transmitting UE (e.g., UE-A) does not cause unnecessary emissions while the received signal quality at the receiving UE (e.g., UE-B) still remains within the desired and acceptable limit to adequately receive signals from the other UE (e.g., UE-A). Examples of such radio parameters that may be modified include: modifying UE current transmit power (i.e., power control or power adjustment), modifying maximum output power, employing a different spectral emission mask, employing a different MPR, employing a different A-MPR, setting or modifying the power adjustment step.

For example based on the reports if the signal quality of the UE (e.g., UE-B) receiving a signal from another UE (e.g., UE-A) is above a threshold, then the network node may configure the UE-A to lower its maximum output power by X dB (e.g., X=6 dB; if difference between threshold and current power is 6 dB). The network node when adjusting one or more D2D UE radio parameters may also take into account reports received from a plurality of D2D UEs (i.e., more than one UE-A and/or more than one UE-B).

Figure 3:
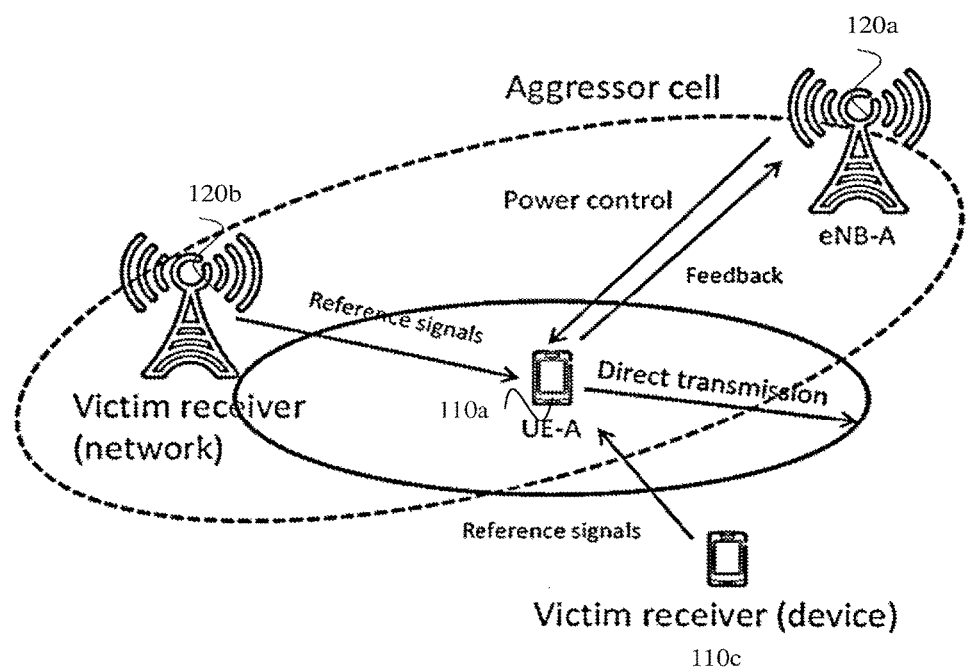
FIG. 3 is a block diagram illustrating an example of network assisted D2D power control.

FIG. 3 illustrates an example of serving network assisted power control of serving network D2D transmissions with the assistance of explicit signalling from a victim network to the serving network D2D UEs. As in the embodiment described with respect to FIG. 2, in FIG. 3, UE "A" is supporting D2D communication with UE "B," at least one of which is connected to the serving network of eNB "A." That is, at least one of UE-A and UE-B maintains a NW-D2D UE communication link. The UE-A and/or UE-B determine the signal quality (implicitly and/or implicitly) of the other UE (e.g., UE-A determines quality of UE-B) as explained with respect to FIG. 2. In addition, at least one of the UE-A and UE-B also determines the signal quality experienced by at least one victim node or one victim cell and sends the information to the network node as further described below.

Examples of a victim node are: a non-serving network node or non-serving cell or a secondary serving cell on the same carrier (f1) on which UE-A and UE-B perform D2D communication, non-serving network node or non-serving cell on the carrier (f2) which is different than the carrier (f1) on which UE-A and UE-B perform D2D communications. The carrier frequencies f1 and f2 may be adjacent, non-adjacent in the same band, or even in different bands. The carrier frequencies f1 and f2 may belong to the same operator or different operators. The carrier frequencies f1 and f2 may operate using the same or different radio access technologies. For example, f1 may use LTE FDD and f2 may use LTE TDD. As another example, f1 may use LTE FDD and f2 may use WCDMA. The carrier frequencies f1 and f2 may or may not be time aligned (e.g., their frame transmit timing may be aligned within certain time such as 1 or 3 μs).

In a first example at least the UE that has a communication link with the network node may implicitly or explicitly determine the signal quality of the victim node, e.g., UE-A does the determination. Such a rule may be pre-defined.

In a second example at least one of the UE-A and UE-B may be configured by the network node (i.e., that also has a communication link with the network node) to implicitly or explicitly determine the signal quality of the victim node. For example, UE-A may be configured by the network node to do so.

In yet another example it may be pre-defined that the UE has a communication link with the network node and that is capable of determining what victim node received quality is required and report the results to the network node.

The UE-A and/or UE-B may also be configured to evaluate the quality of one or more specific victim nodes or cells and in which case information such as their carrier frequencies (e.g., band indicator, absolute radio-frequency channel number (ARFCN), E-UTRA ARFCN, UTRA ARFCN, etc.), cell identifier, channel bandwidth, etc., may be provided by the network. It may also be pre-defined and/or indicated that the UE determines the received quality at the victim node on certain specific carriers. Examples of specific carriers are carriers (e.g. f2 and f3) which are adjacent to the serving carrier or the carrier (f1) on which D2D communication takes place (i.e., f2 and f3 carriers which are on the lower or upper parts of the serving carrier f1). It may further be pre-defined or configured that only or at least the results for the victim nodes or cells within a certain range (e.g., within a certain distance, with RSRP above a threshold, with RSRQ below a threshold, etc.) are reported.

The UE-A and/or UE-B may also use a subset of specific radio resources (e.g., subframes, RBs, etc.) for evaluating the victim node(s). The specific radio resources may be determined by the UE autonomously or may be provided by the network. In one example, the specific radio resources are the radio resources configured for the D2D service.

In the above examples the UE-A and/or UE-B may regularly determine the signal quality and report the results to the network node periodically or when one or more conditions are met. The periodicity may be configured by the network node or it may be pre-defined.

The D2D UE-A or UE-B may or may not have multiple receivers or may or may not be capable of carrier aggregation or receiving on multiple carriers at the same time.

In particular embodiments, the D2D UE-A or UE-B which can receive only on one carrier at a time and when not transmitting or receiving signals for D2D communication and communicating with network node, may tune its receiver to measure signal quality of the victim cell. For example the D2D may tune its receiver on f2 to measure and assess its quality (e.g., path loss between itself and victim node or cell, signal strength, signal quality, etc.) The path loss may be determined as follows: PL=Transmit Signal Power (Ptx)−signal strength (dB), where Ptx can be obtained by acquiring system information of the victim cell.

The D2D UE-A or UE-B may also implicitly determine the signal quality experienced by the victim node or cell based on implicit information such as propagation conditions towards its potential victim nodes (UE's or eNB's), e.g., radio channel characteristics, such as delay spread, etc.

The above signal quality measurements of the received signals from the victim nodes can also possibly be combined with information about the transmit power of the potential victims nodes as well as other transmit specific radio parameters including receive sensitivity, antenna directivity, and receiver link budget of victims. Note that for co-channel victims (i.e., victim cell and D2D operation are on the same frequency, such as f1), a receiver may be a victim if it receives in certain resources (e.g., D2D subframes or part of a bandwidth allocated for D2D), in which case not all neighbour uplink receivers will be interfered with as a victim node. However for co-located, co-existing victim networks operating on a different carrier (e.g., f2, which may belong to the same or different band class as of aggressor node) from the aggressor node, the level of interference seen by the victim network will not be dependent on the allocated resource blocks, but rather it will be dependent on the spectral emission mask (ACLR) and transmit power of the D2D UE. The aggressor node in the example means the node serving D2D operation on f1.

The D2D UE-A or UE-B may also determine the value of any one or more of the above signal quality metrics experienced or expected to be experienced by a plurality of victim nodes.

The D2D UE-A and/or UE-A may signal the information related to the determined received signal quality at the victim node(s) to the network node. For example, based on the gathered metrics and measurements from the victim nodes and possibly D2D receiving nodes, UE-A and/or UE-B may provide a measurement report to its serving network node (i.e., eNB-A in the example).

Based on the received measurement reports from UE-A and/or UE-B as well as other possible measurement reports from additional victim nodes, the network node (e.g. eNB-A) will instruct UE-A and/or UE-B (whichever is transmitting radio signals) to adjust one or more of its transmit specific radio parameters. Examples of such radio parameters to be modified may be the same as described with respect to FIG. 2 (e.g., modifying UE current transmit power (i.e., power control), modifying maximum output power, employing a different spectral emission mask, employing a different MPR, employing a different A-MPR, setting or modifying the power adjustment step).

Figure 4:
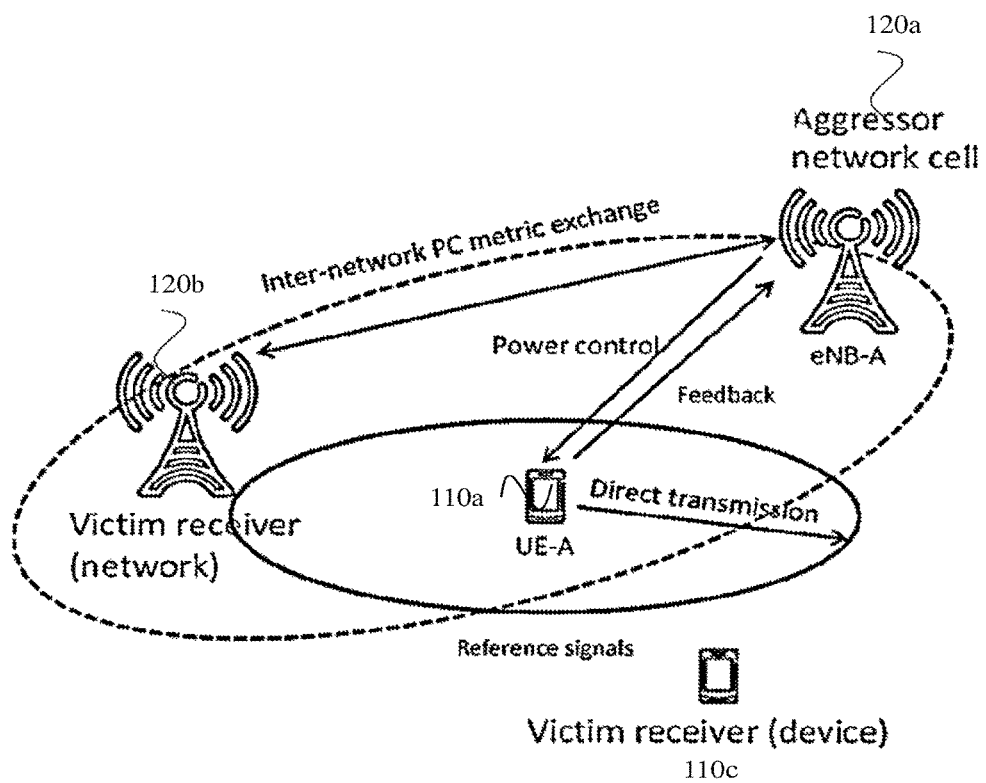
FIG. 4 is a block diagram illustrating an example of network assisted D2D power control.

FIG. 4 illustrates an example of serving network assisted power control of serving network D2D transmissions with the assistance of explicit signalling from a victim network to the serving network node(s). Similar to the embodiment described with respect to FIG. 3, the aggressor network nodes may employ information on the victim networks to assist with the determination of the power control of the serving network D2D devices. However, instead of direct measurements of victim node signals as shown in FIG. 3, the aggressor network obtains location information of one or more victim nodes. The positioning information of the victim nodes can be absolute location and/or relative location with respect to the position of the aggressor network. The location information of these notes can be pre-defined, stored in the aggressor node (i.e., the node serving D2D communication), or received from another node, such as a positioning node, core network node (e.g., mobility management entity (MME), operation and maintenance node (O&M), operations support system (OSS), self-organizing network (SON) node, etc.).

The aggressor node may also determine the location of one or more victim nodes based on implicit information that can assist in determining their location. Examples of the implicit information can be the radio fingerprinting information of the propagation conditions as seen by the victim nodes. The aggressor node can receive such information from another node and/or. Examples of fingerprinting information are RSRP, RSRQ, propagation delay between certain UE and victim node etc. Based on this relative positioning and propagation information of the victim nodes with respect to the aggressor network, the aggressor network node(s) can assess the impact of the D2D UE transmit powers on the victim network and instruct the D2D UE to appropriately adjust one of its radio specific transmit parameters. Examples of such radio parameters to be modified may be the same as described with respect to FIGS. 2 and 3, for example, modifying UE current transmit power (i.e., power control), modifying maximum output power, employing a different spectral emission mask, employing a different MPR, employing a different A-MPR, setting or modifying the power adjustment step.

In another embodiment, any two or more of the techniques described with respect to FIGS. 2-4 may be combined. That is, the network node serving or managing D2D communication may use any combination of techniques to adjust the transmit power or other radio parameters of one or more D2D UEs transmitting radio signals for D2D communications.

For example the network node (i.e., aggressor network node) may only reduce transmit power of those D2D UEs which are close to the victim node by using the information obtained as described with respect to FIG. 3 and/or FIG. 4.

The combined method may help to ensure that the D2D UE transmit power is not unnecessarily reduced while at the same time managing interference so that the performance of the victim node(s) is not adversely affected.

In some embodiments, the aggressor network node (say first node) may signal to one or more other network nodes (e.g., neighbouring eNBs or say second node) information related to the D2D power control scheme used for controlling transmit power of one or more D2D UEs, which are served by or managed by the network node. For example the signalled information can be one or more of the following:

(1) pre-defined identifiers of the power control schemes employed by the network node as shown in table below;

(2) detailed information such as quality measurements used for controlling the transmit power of D2D UEs, number of D2D UEs whose Tx power is controlled, time scale (e.g., how often the Tx power is modified, etc.), the parameter that is modified (e.g., MPR, maximum power, etc.), the resulting absolute or relative transmit power after the adjustment, the amount of power adjustment, power adjustment step (e.g., 2 d).

TABLE 1

Power control scheme IDs

| Identifier of PC scheme for D2D UEs | PC scheme |
|---|---|
| 0 | eNB controls D2D UE1 power based on received quality of one or more D2D UE2 |
| 1 | eNB controls D2D UE1 power based on received quality of one or more D2D UE2 and received quality of one or more victim nodes |
| 2 | eNB controls D2D UE1 power based on location of one or more victim nodes with respect to location of D2D UE1 |
| 3 | Combined method comprising of any two or more schemes # 0, 1 and 2 |

The other network node may be a victim node or a network node belonging to the same operator as that of the aggressor network node.

The second network node receiving the information may use it to adapt its own radio parameters. For example if D2D UEs are not power controlled or not frequently power controlled then the second node may adjust its receiver to ensure that the effect of the emissions from D2D UEs towards the second node is minimized or causes less performance degradations.

Figure 5:
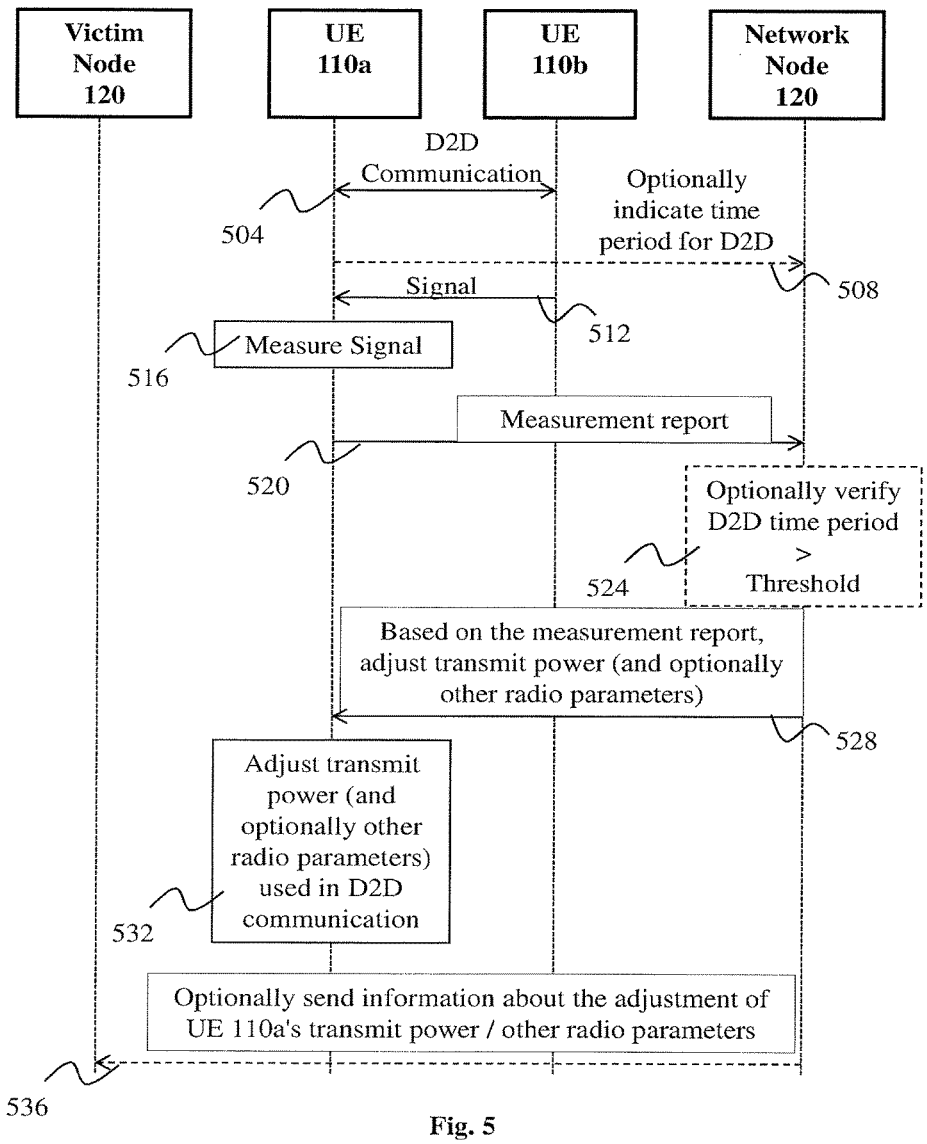
FIG. 5 is a signal flow diagram illustrating an example of a method for network assisted D2D power control.

FIG. 5 is a signal flow diagram illustrating an example of a method for network assisted D2D power control. In FIG. 5, wireless devices/UEs 110a and 110b are in D2D communication as shown in step 504. At least UE 110a is in coverage of a first network node 120 (e.g., serving network node). UE 110b may optionally be in coverage of the first network node 120 as well. The D2D communication between UE 110a and UE 110b potentially causes interference to victim node 120. The first network node operates on a first carrier frequency, f1, and the victim node operates on a second carrier frequency, f2, as was described with respect to FIG. 3 above.

At step 508, UE 110a optionally indicates a time period for D2D communication. The indication may be explicit or implicit. For example, an explicit indication may be a time interval (the total from the start or the remaining time with respect to the time of sending the indication. An implicit indication may be a validity period of the radio resources allocated for the D2D service (e.g., a validity time period for which the set of subframes allocated for transmissions from a D2D broadcast D2D UE-transmitter), where the validity period may also be pre-defined.

At step 512, UE 110a receives a signal from UE 110b and at step 516, UE 110a measures the received signal. For example, UE 110a may measure one or more of the path loss, RSRP, RSRQ, BER, SINR, SNR, BLER, etc. In some embodiments, UE 110a may perform measurements for determining the delay spread, Doppler spread, or other propagation conditions experienced by or expected to be experienced by the UE 110b and/or the quality of the signals that UE 110b receives from UE 110a. At step 520, UE 110a sends a measurement report to first network node 120.

At step 524, first network node 120 optionally verifies the D2D time period (e.g., if a D2D time period was received at step 508). If the time period is relatively short (e.g., below a threshold), the network node may decide to not adjust the transmit power because the potential interference condition is not expected to last for very long. Thus, the remaining steps may be skipped. If the time period is relatively long (e.g., above a threshold), the network node may decide to adjust the transmit power and may proceed to step 528.

At step 528, first network node 120 selects radio parameters for the D2D communication (based at least in part on the measurement report received at step 520) and sends UE 110a instructions to make an adjustment of the radio parameters used in D2D communication. The radio parameters include the transmit power and optionally include other radio parameters, such as current transmit power level, maximum output power, spectral emission mask, maximum power reduction, additional maximum power reduction, and/or power adjustment step. The radio parameters may be sent in any suitable manner. For example, the radio parameters may be sent in the same message or in different messages.

At step 532, UE 110a adjusts the transmit power as instructed by first network node 120 in step 528. UE 110a may also adjust the other radio parameters, for example, if first network node 120 sent any of the optional radio parameters in step 528.

At step 536, network node 120 optionally sends information about the adjustment of UE 110a's transmit power (and other radio parameters, if applicable) to victim node 120. The information may help the victim node to mitigate interference caused by the D2D communication between UE 110a and UE 110b.

Figure 6:
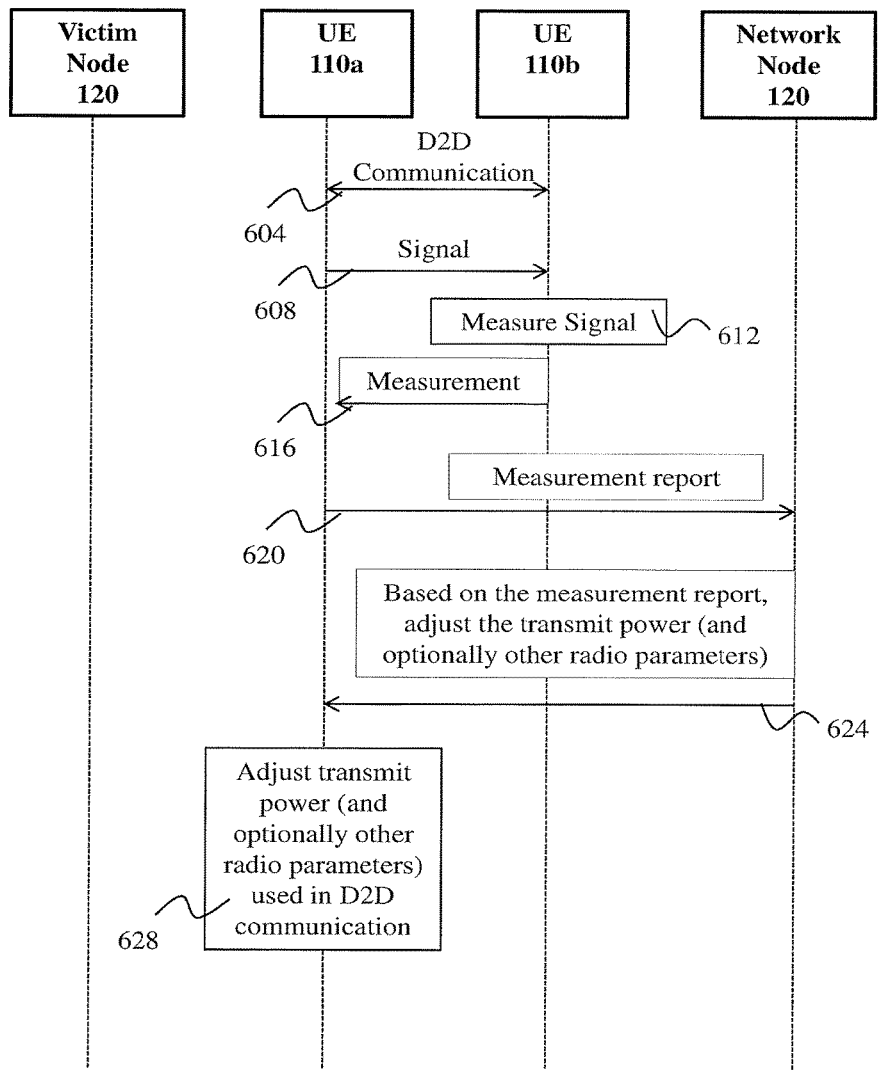
FIG. 6 is a signal flow diagram illustrating an example of a method for network assisted D2D power control.

FIG. 6 is a signal flow diagram illustrating an example of a method for network assisted D2D power control. The network may be similar to that described with respect to FIG. 5. At step 604, UE 110a and UE 110b are in D2D communication. At step 608, UE 110b receives a signal from UE 110a. UE 110b measures the received signal. For example, UE 110b may measure one or more of the path loss, RSRP, RSRQ, BER, SINR, SNR, BLER, etc. In some embodiments, UE 110b may perform measurements for determining the delay spread, Doppler spread, or other propagation conditions experienced by or expected to be experienced by the UE 110a and/or the quality of the signals that UE 110a receives from UE 110b. At step 616, UE 110b sends a message to UE 110a indicating the results of the measurement made by UE 110b. At step 620, UE 110a sends a measurement report to first network node 120 based at least in part on the measurement information received from UE 110b (and optionally based on measurement information measured by UE 110a, as described with respect to step 516 of FIG. 5). Steps 620-628 may be generally analogous to steps 520-532 of FIG. 5.

Figure 7:
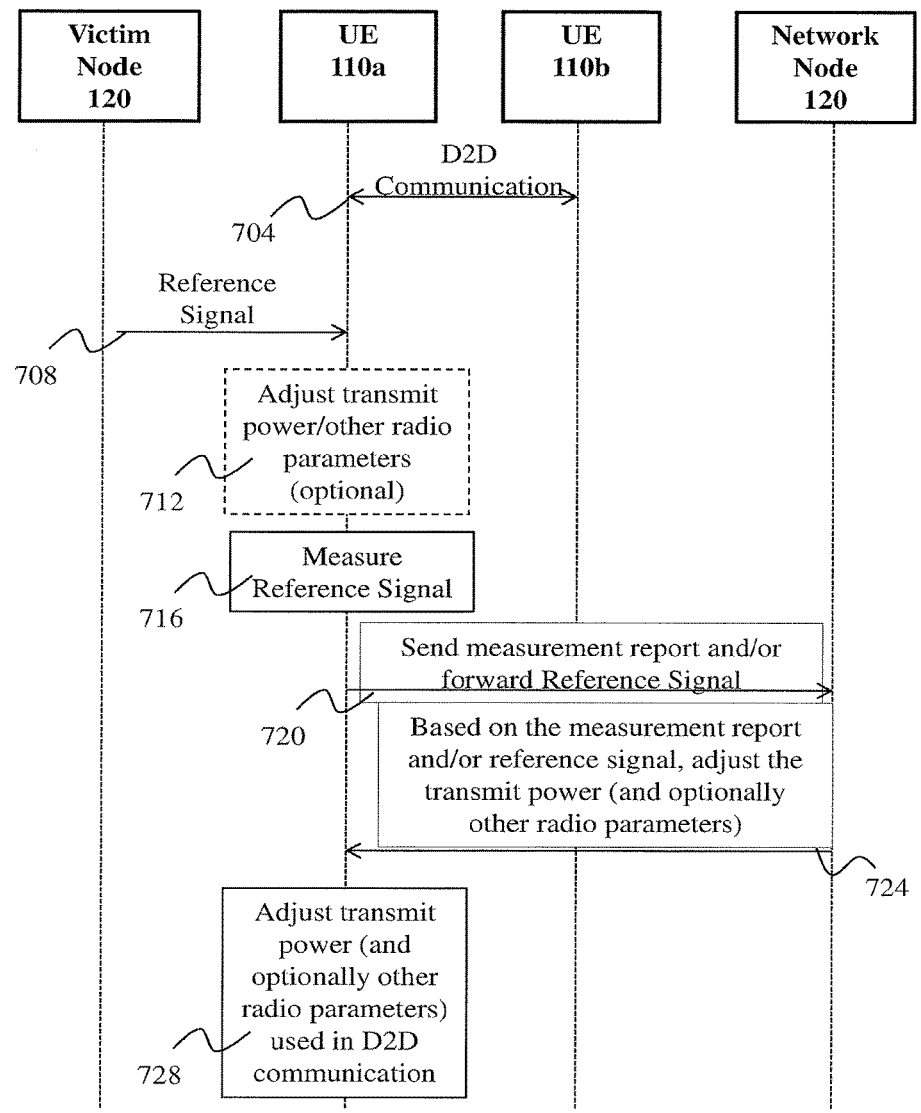
FIG. 7 is a signal flow diagram illustrating an example of a method for network assisted D2D power control.

FIG. 7 is a signal flow diagram illustrating an example of a method for network assisted D2D power control. The network may be similar to that described with respect to FIG. 5. At step 704, UE 110a and UE 110b are in D2D communication. At step 708, UE 110a receives a reference signal from victim node 120. At step 712, UE 110a optionally adjusts its transmit power and/or other radio parameters based on the received reference signal. At step 716, UE 110a measures the reference signal. At step 720, UE 110a sends a measurement report and/or forwards the reference signal to network node 120. An example was previously described with respect to FIG. 3 above. Steps 724-728 may be generally analogous to steps 520-532 of FIG. 5, wherein the first network node 120 determines the adjustment of the transmit power that UE 110a uses in the D2D communication based at least partially on the measurement of the victim node 120's reference signal or the forwarded reference signal.

Figure 8:
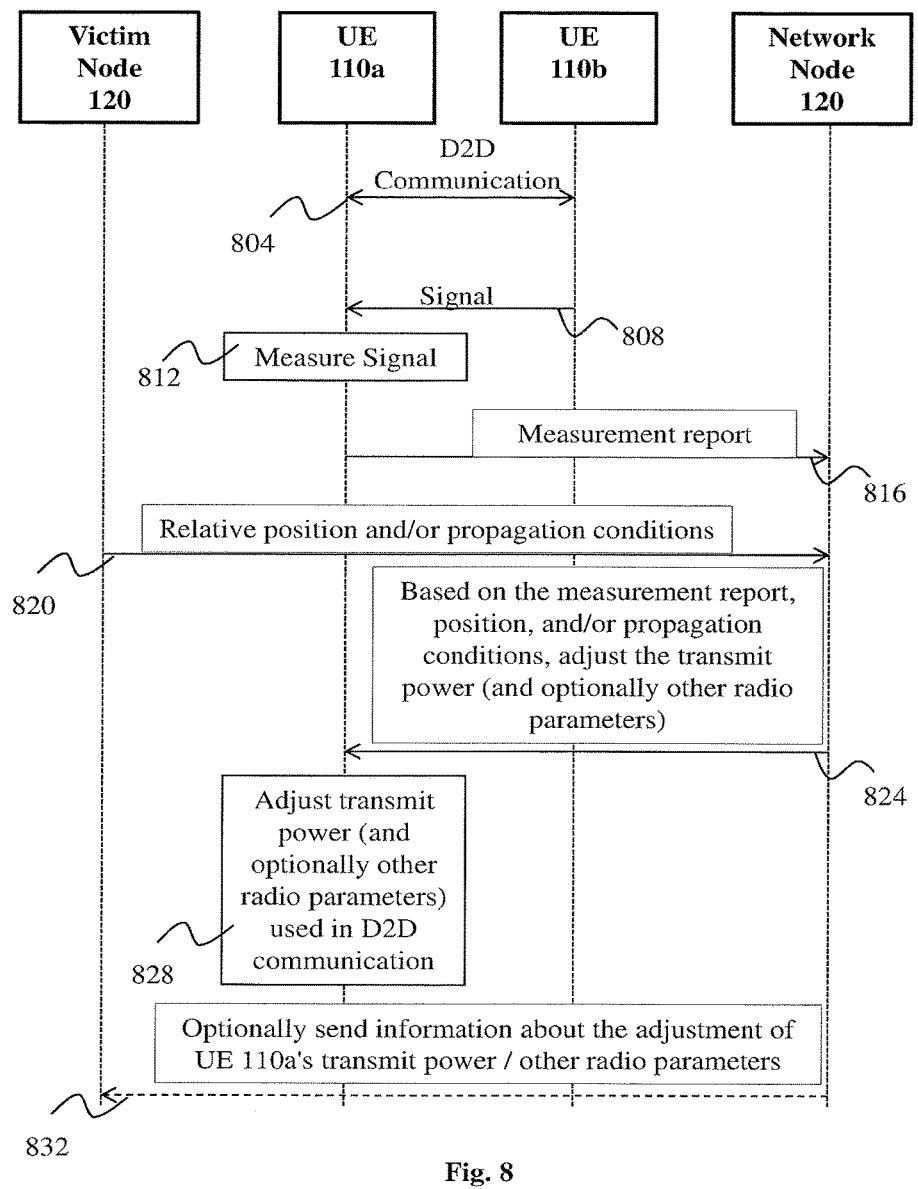
FIG. 8 is a signal flow diagram illustrating an example of a method for network assisted D2D power control.

FIG. 8 is a signal flow diagram illustrating an example of a method for network. The network may be similar to that described with respect to FIG. 5, and steps 804-816 may be generally analogous to steps 504-520 of FIG. 5. At step 820, victim node 120 sends relative position and/or propagation conditions seen by victim node 120 to network node 120. An example was previously described with respect to FIG. 4 above. Steps 824-832 may be generally analogous to steps 528-536 of FIG. 5, wherein the first network node 120 determines the adjustment of the transmit power that UE 110a uses in the D2D communication based at least partially on the relative position and/or propagation conditions received from victim node 120.

The embodiments described above may be implemented using any suitable network or combination of networks. Network 100 may use any suitable radio access technology, such as long term evolution (LTE), LTE-Advanced, UMTS, HSPA, GSM, cdma2000, WiMax, WiFi, and/or other suitable radio access technology. The network may include any suitable combination of one or more radio access technologies. Although certain embodiments may be described within the context of certain radio access technologies, the scope of the disclosure is not limited to the examples and other embodiments could use different radio access technologies. In addition, the network nodes may be deployed throughout the network a homogenous deployment, heterogeneous deployment, or mixed deployment. A homogeneous deployment may generally describe a deployment made up of the same (or similar) type of radio network nodes and/or similar coverage and cell sizes and inter-site distances. A heterogeneous deployment may generally describe deployments using a variety of types of radio network nodes having different cell sizes, transmit powers, capacities, and inter-site distances. For example, a heterogeneous deployment may include a plurality of low-power nodes placed throughout a macro-cell layout. Deploying low-power nodes throughout a macro-cell layout may extend capacity in certain traffic hotspots, however, the differences in the various nodes (such as differences in transmit power) may tend to increase the complexity of managing interference in the uplink and/or in the downlink as compared to a homogenous deployment. Mixed deployments may include a mix of homogenous portions and heterogeneous portions.

A wireless device may include any suitable combination of hardware and/or software. For example, in particular embodiments, a wireless device 110 may include the components described with respect to FIGS. 9A-9B below. Similarly, a network node (e.g., radio access node 120) may include any suitable combination of hardware and/or software. For example, in particular embodiments, a network node may include the components described with respect FIGS. 10A-10B below. The network may include multiple different types of radio network nodes including, for example, macro cell nodes (e.g., base stations, eNodeBs), low-power nodes (e.g., pico-, femto-, or other micro-base stations, home eNodeBs), and relay nodes.

Figure 9A:
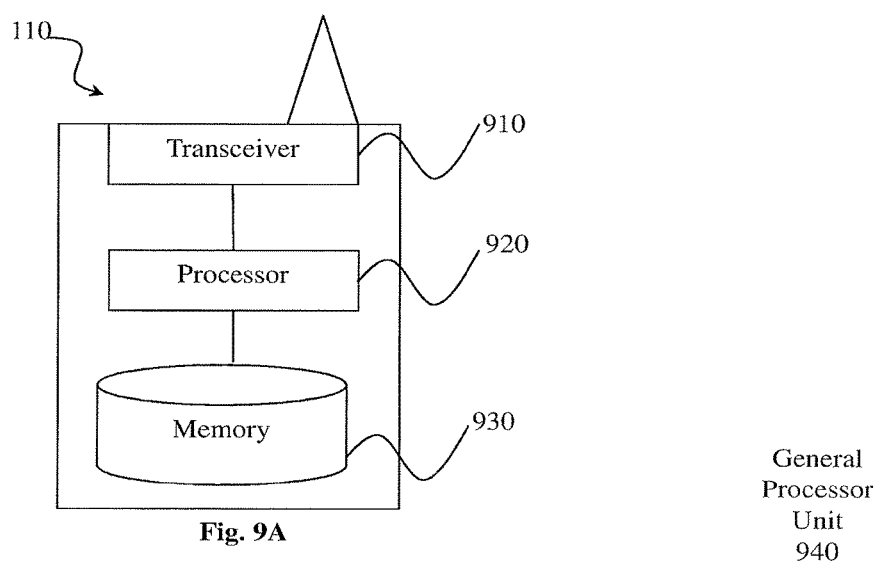
FIG. 9A is a block diagram illustrating an example of a wireless device.

FIG. 9A is a block diagram illustrating embodiments of a wireless device 110. Examples of the wireless device 110 include a mobile phone, a smart phone, a PDA (Personal Digital Assistant), a portable computer (e.g., laptop, tablet), a sensor, a modem, a machine type (MTC) device aka machine to machine (M2M) device, laptop embedded equipped (LEE), laptop mounted equipment (LME), USB dongles, or other device that can provide wireless communication. A wireless device may also be referred to as a radio node, user equipment (UE), a station (STA), or a terminal in some embodiments, and examples described throughout the disclosure can be generalized to any suitable wireless device. The wireless device comprises transceiver 910, processor 920, and memory 930. In some embodiments, transceiver 910 facilitates transmitting wireless signals to and receiving wireless signals from a radio network node (e.g., via an antenna), processor 920 executes instructions to provide some or all of the functionality described above as being provided by wireless devices, and memory 930 stores the instructions executed by processor 920.

Processor 920 may comprise any suitable combination of hardware and software implemented in one or more modules to execute instructions and manipulate data to perform some or all of the described functions of the wireless device. In some embodiments, processor 920 may include, for example, one or more computers, one or more central processing units (CPUs), one or more microprocessors, one or more applications, and/or other logic.

Memory 930 is generally operable to store instructions, such as a computer program, software, an application comprising one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Alternative embodiments of the wireless device may include additional components beyond those shown in FIG. 9A that may be responsible for providing certain aspects of the wireless device 110's functionality, including any of the functionality described herein and/or any additional functionality (including any functionality necessary to support the solution described herein). The embodiments described herein are applicable when wireless device 110 is configured for single carrier operation and when wireless device 110 is configured for multi-carrier or carrier aggregation based D2D communication.

Figure 9B:
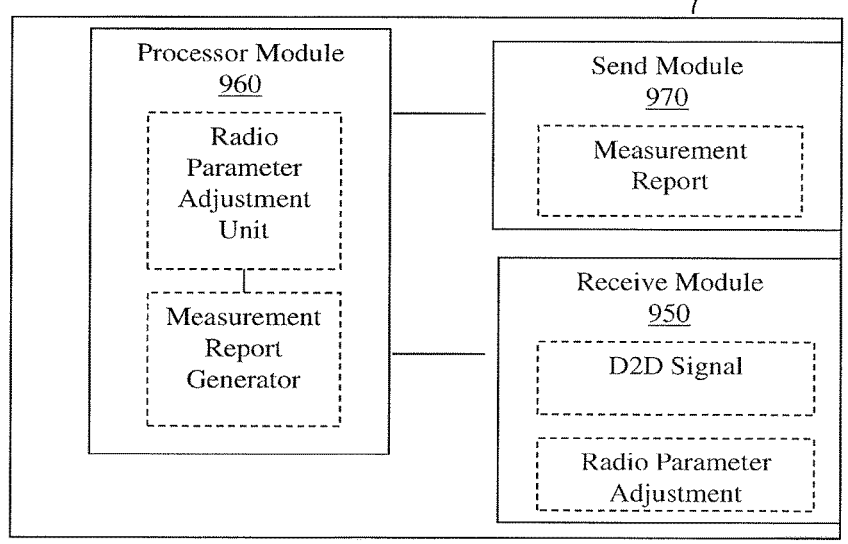
FIG. 9B is a block diagram illustrating example components of a wireless device.

FIG. 9B illustrates an example of components of wireless device 110a. In some embodiments, the components may be implemented using one or more processors 920 described with respect to FIG. 9A. The components include a general processor unit 940 comprising a receive module 950, a processor module 960, and a send module 970. According to some embodiments, receive module 950 receives a D2D signal from another wireless device 110b in D2D communication with the wireless device 110a. The D2D signal may be an explicit indication of measurement information from wireless device 110b (e.g., as measured by wireless device 110b), or the D2D signal may be a signal that wireless device 110a measures to obtain measurement information. Receive module 950 communicates the D2D signal to processor module 960 and processor module 960 generates a measurement report in response. Processor module 960 communicates the measurement report to send module 970. Send module 970 sends at least one measurement report to a first network node 120. The measurement report indicates a received signal measurement or path loss with respect to a second wireless device 110b in D2D communication with the first wireless device 110a and/or a received signal measurement or path loss with respect to a victim node. Receive module 950 then receives from the first network node 120 a radio parameter adjustment. The radio power adjustment comprises a transmit power that the first wireless device 110a is to use in the D2D communication. Receive module 950 communicates the radio power adjustment to processor module 960, and processor module 960 adjusts the transmit power used in the D2D communication accordingly.

Figure 10A:
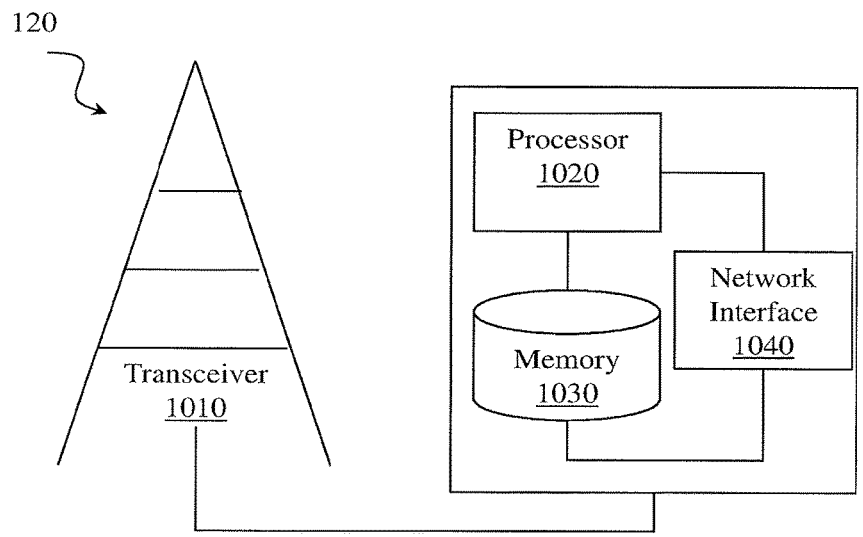
FIG. 10A is a block diagram illustrating an example of a network node.

FIG. 10A is a block diagram illustrating embodiments of a network node, such as a radio access node 120. A radio access node 120 may be capable of receiving radio signals or transmitting radio signals in one or more frequencies, and may operate in single-radio access technology, multi-radio access technology, or multi-standard mode (e.g., MSR). Examples of radio access nodes 120 may include, base stations, femto base stations, home base stations, eNodeBs, small radio base stations, remote radio heads (RRHs), remote radio frequency unit (RRU), fixed relays, mobile relays, transmit-only radio network nodes, receive-only radio network nodes, a wireless access point (e.g., a Wi-Fi access point), a low-power node, and/or other radio network nodes (which may be equipped with a UE-like interface in some embodiments).

The radio access node 120 comprises transceiver 1010, processor 1020, memory 1030, and network interface 1040. In some embodiments, transceiver 1010 facilitates transmitting wireless signals to and receiving wireless signals from a wireless device 110 (e.g., via an antenna), processor 1020 executes instructions to provide some or all of the functionality described above as being provided by a radio access node 120, memory 1030 stores the instructions executed by processor 1020, and network interface 1040 communicates signals to backend network components, such as a gateway, switch, router, Internet, Public Switched Telephone Network (PSTN), etc.

Processor 1020 may comprise any suitable combination of hardware and software implemented in one or more modules to execute instructions and manipulate data to perform some or all of the described functions of radio access node 120. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application comprising one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for the radio network node, send output from the radio network node, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Alternative embodiments of the radio access node 120 may include additional components beyond those shown in FIG. 10A that may be responsible for providing certain aspects of the radio access/network node's functionality, including any of the functionality described herein and/or any additional functionality (including any functionality necessary to support the solution described herein). The various different types of radio access nodes 120 may include components having the same physical hardware but configured (e.g., via programming) to support different radio access technologies, or may represent partly or entirely different physical components. Other network nodes, such as a base station controller, MME, O&M, OSS, SON, various core network nodes 130, etc. may include components similar to processor 1020, memory 1030, and network interface 1040, but may not necessarily include transceiver 1010.

Although certain examples have described network node as the serving network node of the D2D UE, in other embodiments the functionality described as being performed by the first network node may be performed by any network node with which the D2D UE can establish or maintain a communication link and/or receive information (e.g., via broadcast channel).

Figure 10B:
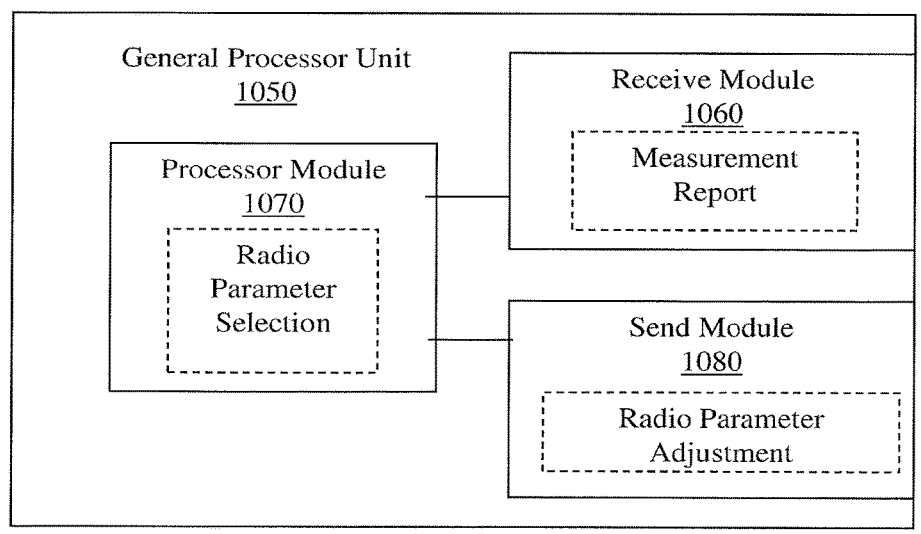
FIG. 10B is a block diagram illustrating an example of components of a network node.

FIG. 10B illustrates an example of components of the network node. In some embodiments, the components may be implemented using one or more processors 1020 described with respect to FIG. 10A. The components include a general processor unit 1050 comprising a receive module 1060, a processor module 1070, and a send module 1080. According to some embodiments, receive module 1060 receives at least one measurement report from at least one of the first wireless device 110a and a second wireless device 110b in D2D communication with the first wireless device 110a. The measurement report indicates a received signal measurement or path loss with respect to the other of the first wireless device 110a and the second wireless device 110b and/or a received signal measurement or path loss with respect to a victim node. Receive module 1060 communicates the measurement report to processor module 1070. Processor module 1070 makes a radio parameter selection based at least in part on the measurement report. Processor module 1070 communicates the radio parameter selection to send module 1080, and send module 1080 sends the first wireless device 110a instructions to make an adjustment of the transmit power that the first wireless device uses in the D2D communication.

Some embodiments of the disclosure may provide one or more technical advantages. Some embodiments may benefit from some, none, or all of these advantages. Other technical advantages may be readily ascertained by one of ordinary skill in the art. A technical advantage of some embodiments may include enabling a D2D UE to more efficiently continue the D2D communication regardless of the type of coverage in which the D2D communication takes place. For example, in some embodiments, the transmissions of the D2D UEs may be managed to avoid unnecessary or any additional degradation to the other UEs and/or network nodes when operating in PNC or ONC coverage scenarios. In some embodiments, the D2D UEs can continue their operation when network nodes are unavailable or partially available. For example, D2D UE may be used to provide public safety services when network nodes are unavailable or partially available. In some embodiments, D2D operation can continue between UEs even during times that the network node does not maintain a communication link with the UEs, for example, because the network node may have resource constraint due to lack of resources, heavy load, or disastrous situation.

In some embodiments, a first network node (e.g., a serving node managing D2D communication between a first D2D UE and a second D2D UE) may perform a method that includes receiving a measurement report from at least one of the first and the second D2D UEs. The measurement report is indicative of the signal measurement or path loss with respect to the other D2D UE and/or with respect to a second network node (e.g., a victim node). The method further includes adjusting the transmit power of at least one of the first and the second D2D UEs used for D2D operation, wherein the adjustment is based on the received measurement report. In some embodiments, the method may optionally further include obtaining a D2D UE capability in terms of which one of at least two pre-defined radio emission mask requirements the D2D UE is capable of meeting (i.e., whether it supports 1st mask (existing) or 2nd mask (tighter)) and the adjusting is further based on the obtained capability of the D2D UE.

In some embodiments, a D2D UE may perform a method that includes sending a measurement report to a first network node. The measurement report is indicative of the signal measurement or path loss with respect to the other D2D UE and/or with respect to a second network node (victim node). The method may further include adjusting the transmit power at the D2D UE in response to an instruction provided by the first network node (wherein the instruction to adjust the transmit power is based on the measurement report). In some embodiments, the method may optionally further include sending the network node D2D UE capability in terms of which one of at least two pre-defined radio emission mask requirements the UE is capable of meeting (i.e., whether it supports 1st mask (existing) or 2nd mask (tighter)) and the instruction is further based on the capability of the D2D UE.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. The above description of the embodiments does not constrain this disclosure. Other changes, substitutions, and alterations are possible without departing from the spirit and scope of this disclosure.

The invention claimed is:

1. A method in a first network node for managing a transmit power of a first wireless device that is capable of device-to-device, D2D, communication, the method comprising:
   receiving at least one measurement report from at least one of the first wireless device and a second wireless device in D2D communication with the first wireless device, the at least one measurement report indicating a received signal measurement or path loss with respect to the other of the first wireless device and the second wireless device and/or a received signal measurement or path loss with respect to a victim node; and
   sending the first wireless device instructions to make an adjustment of the transmit power that the first wireless device uses in the D2D communication when the first device is in partial coverage or out of coverage of the cellular network, the partial coverage occurring when the first wireless device is out of direct coverage of the cellular network but is capable of communicating with the cellular network indirectly via the D2D communication, wherein the adjustment is at least partially based on the at least one measurement report indicating the received signal measurement or path loss with respect to the other of the first wireless device and the second wireless device and/or the received signal measurement or path loss with respect to the victim node.

2. The method of claim 1, wherein the adjustment of the transmit power that the first wireless device uses in the D2D communication is partially based on the position of the first wireless device relative to the position of the victim node.

3. The method of claim 1, further comprising:
   obtaining from the victim node information on propagation conditions seen by the victim node;
   wherein the adjustment of the transmit power that the first wireless device uses in the D2D communication is partially based on the obtained propagation conditions.

4. The method of claim 1, further comprising sending information related to the adjustment of the first wireless device's transmit power to the victim node or another network node.

5. The method of claim 1, further comprising:
   receiving an indication of a time period during which the D2D communication is going to take place; and
   determining to adjust the transmit power that the first wireless device uses in the D2D communication if the time period during which the D2D communication is going to take place exceeds a threshold.

6. The method of claim 1, further comprising sending, based on the at least one measurement report, a message instructing the first wireless device to make an adjustment of at least one other radio parameter that the first wireless device uses in the D2D communication, the at least one other radio parameter selected from the group consisting of: current transmit power level, maximum output power, spectral emission mask, maximum power reduction, additional maximum power reduction, and power adjustment step.

7. A method in a first wireless device, the method comprising:
   sending at least one measurement report to a first network node, the at least one measurement report indicating a received signal measurement or path loss with respect to a second wireless device in D2D communication with the first wireless device and/or a received signal measurement or path loss with respect to a victim node;
   receiving from the first network node a transmit power that the first wireless device is to use in the D2D communication when the first device is in partial coverage or out of coverage of the cellular network, the partial coverage occurring when the first wireless device is out of direct coverage of the cellular network but is capable of communicating with the cellular network indirectly via the D2D communication, the transmit power based on the at least one measurement report indicating the received signal measurement or path loss with respect to the second wireless device in D2D communication with the first wireless device and/or the received signal measurement or path loss with respect to the victim node; and
   adjusting the transmit power that the first wireless device uses in the D2D communication based on the received transmit power.

8. The method of claim 7, further comprising:
   sending the first network node an indication of a time period during which the D2D communication is going to take place.

9. The method of claim 7, further comprising:
   receiving from the network node at least one other radio parameter that the first wireless device is to use in the D2D communication, the at least one other radio parameter selected from the group consisting of: current transmit power level, maximum output power, spectral emission mask, maximum power reduction, additional maximum power reduction, and power adjustment step; and
   adjusting the at least one other radio parameter accordingly.

10. The method of claim 7, wherein the at least one measurement report includes a signal measurement that the first wireless communication measures on a signal transmitted by the second wireless device.

11. The method of claim 7, wherein the at least one measurement report includes a signal measurement that the first wireless communication receives from the second wireless device in response to the second wireless device measuring a signal transmitted by the first wireless device.

12. A first network node for managing a transmit power of a first wireless device that is capable of device-to-device, D2D, communication, the network node comprising processing means operable to:
receive at least one measurement report from at least one of the first wireless device and a second wireless device in D2D communication with the first wireless device, the at least one measurement report indicating a received signal measurement or path loss with respect to the other of the first wireless device and the second wireless device and/or a received signal measurement or path loss with respect to a victim node; and
send the first wireless device instructions to make an adjustment of the transmit power that the first wireless device uses in the D2D communication when the first device is in partial coverage or out of coverage of the cellular network, the partial coverage occurring when the first wireless device is out of direct coverage of the cellular network but is capable of communicating with the cellular network indirectly via the D2D communication, wherein the adjustment is at least partially based on the at least one measurement report indicating the received signal measurement or path loss with respect to the other of the first wireless device and the second wireless device and/or the received signal measurement or path loss with respect to the victim node.

13. The first network node of claim 12, wherein the adjustment of the transmit power that the first wireless device uses in the D2D communication is partially based on the position of the first wireless device relative to the position of the victim node.

14. The first network node of claim 12, further operable to:
obtain from the victim node information on propagation conditions seen by the victim node;
wherein the adjustment of the transmit power that the first wireless device uses in the D2D communication is partially based on the obtained propagation conditions.

15. The first network node of claim 12, further operable to send information related to the adjustment of the first wireless device's transmit power to the victim node or another network node.

16. The first network node of claim 12, further operable to:
receive an indication of a time period during which the D2D communication is going to take place; and
determine to adjust the transmit power that the first wireless device uses in the D2D communication if the time period during which the D2D communication is going to take place exceeds a threshold.

17. The first network node of claim 12, further operable to send, based on the at least one measurement report, a message instructing the first wireless device to make an adjustment of at least one other radio parameter that the first wireless device uses in the D2D communication, the at least one other radio parameter selected from the group consisting of: current transmit power level, maximum output power, spectral emission mask, maximum power reduction, additional maximum power reduction, and power adjustment step.

18. A first wireless device comprising processing means operable to:
send at least one measurement report to a first network node, the at least one measurement report indicating a received signal measurement or path loss with respect to a second wireless device in D2D communication with the first wireless device and/or a received signal measurement or path loss with respect to a victim node;
receive from the first network node a transmit power that the first wireless device is to use in the D2D communication when the first device is in partial coverage or out of coverage of the cellular network, the partial coverage occurring when the first wireless device is out of direct coverage of the cellular network but is capable of communicating with the cellular network indirectly via the D2D communication, the transmit power based on the at least one measurement report indicating the received signal measurement or path loss with respect to the second wireless device in D2D communication with the first wireless device and/or the received signal measurement or path loss with respect to the victim node; and
adjust the transmit power that the first wireless device uses in the D2D communication based on the received transmit power.

19. The first wireless device of claim 18, further operable to:
send the first network node an indication of a time period during which the D2D communication is going to take place.

20. The first wireless device of claim 18, further operable to:
receive from the network node at least one other radio parameter that the first wireless device is to use in the D2D communication, the at least one other radio parameter selected from the group consisting of current transmit power level, maximum output power, spectral emission mask, maximum power reduction, additional maximum power reduction, and power adjustment step; and
adjust the at least one other radio parameter accordingly.

21. The first wireless device of claim 18, wherein the at least one measurement report includes a signal measurement that the first wireless communication measures on a signal transmitted by the second wireless device.

22. The first wireless device of claim 18, wherein the at least one measurement report includes a signal measurement that the first wireless communication receives from the second wireless device in response to the second wireless device measuring a signal transmitted by the first wireless device.

* * * * *